Patented May 3, 1938

2,116,308

UNITED STATES PATENT OFFICE 2,116,308

BEVERAGE PREPARATION

Herbert C. Gore and Charles N. Frey, Scarsdale, N. Y., assignors to Standard Brands Incorporated, New York, N. Y., a corporation of Delaware No Drawing. Application January 30, 1934, Serial No. 708,968

4 Claims. (Cl. 99—71)

This invention relates to a process of preparing a coffee extract. More particularly it relates to a liquid coffee extract and includes correlated improvements and discoveries whereby the taste and aroma of the coffee are conserved.

Prior to the present invention liquid coffee extracts have appeared on the market. It has been recognized that these could be considerably improved by the inclusion of a greater percentage of solids, aromatic, astringent and other desired principles which characterize the flavor of freshly prepared coffee of good quality. An object of the present invention is the preparation of a coffee extract which has these improved qualities.

It is also an object of the invention to provide an extract from which coffee can be quickly and easily prepared by the addition of a predetermined quantity thereof to water, and a further object is the provision of a process which will produce a coffee extract with effective retention of aroma, astringent and other desirable qualities.

An additional object of the invention is to provide a concentrated liquid extract of coffee that can be produced readily and economically on a commercial scale.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In accordance with the present invention ground roasted coffee is mixed with an aqueous medium as water or a filtrate from a previous extraction of coffee with water, heated at a temperature of about 90° C. to about 95° C. for a short period of time, filtered, which may be satisfactorily effected by the use of a suction filter, and subsequently cooled.

More particularly the procedure entails mixing a charge of fresh, finely ground roasted coffee with about twice the amount by weight of water, and heating with stirring, at a temperature of about 90° C. to about 95° C. for from 3 to 5 minutes. The mixture is then poured on a filter and drained for a few minutes under suction. The resultant filtrate is immediately cooled and kept at a low temperature, preferably at a cold storage temperature of about 6° C.

The extraction residue or filter cake is then mixed with water bearing a weight ratio to the original charge of coffee of about 2:1, heated to boiling, poured on a suction filter and filtered, all in the manner indicated above. The resultant filtrate is immediately cooled.

The thus obtained residue or cake is now mixed with water in the aforesaid proportions, heated to boiling, poured on a suction filter, filtered, and cooled all in the manner indicated above.

A fresh charge of finely ground roasted coffee is then taken and extracted with the use of the filtrate from the second extraction described above and the filtrate from the third extraction above given is used in the second extraction stage i. e. of the first filter cake resulting from extraction of this fresh charge of coffee. The last or third extraction stage is carried out with water. In each case the quantity of filtrate may be augmented by addition of water if there is an insufficient amount of the filtrate to provide the desired proportions.

These three stages are repeated over and over again, each batch of the finely ground coffee entering the system being treated with filtrate from the second extraction stage, and the grounds or extraction residue resulting then being treated with filtrate from the third extraction stage from a previous operation. At the end of the third extraction the exhausted grounds are rejected.

The liquid coffee extract consists of the filtrate or a mixture of filtrates resulting from the first extraction step of each successive fresh charge of coffee. This extract is preferably kept cool and when desired for use the liquid may be decanted from any sediment which may have deposited. The amount of sediment may be reduced by additional steps in the process as described below.

We have found that a cooling or chilling of the filtrates from each extraction increases the sedimentation thereby reducing the amount of sediment that may deposit in the finished extract. The sedimentation may be increased further by the addition of a coagulant as an albuminous material for example egg albumen, and gelatin to the cooled filtrate resulting from the extraction of a fresh charge of coffee. This results in a clarification of the extract. Satisfactory results are obtained when using albumen in the form of slightly beaten egg white in an amount of about 5 cubic centimeters per 100 cubic centimeters of filtrate, i. e. in the proportion of 1 to 20.

For example the following procedure gave the results indicated. Egg albumen obtained from newly laid eggs was slightly beaten. Fresh roasted finely ground coffee was extracted by the countercurrent procedure outlined above. The final extracts obtained containing about 14.7 per cent solids were cooled to room temperature. Then 100 cubic centimeters were mixed by shaking serially with increasing amounts of the egg albumen. Each lot was heated to 95° C. in a boiling water bath, cooled to room temperature in stoppered flasks and then poured on folded filters. The filters were allowed to drain during a forty-four hour period when the filtrates were poured off from any sediment formed and the amounts of the sediments which separated from the filtrates were noted. The results are tabulated below:

| Coffee | Egg white | Sediment separated from filtrates |
|---|---|---|
| cc. | cc. | |
| 100 | 0 | Much. |
| 100 | 1 | Slight. |
| 100 | 2 | Very slight. |
| 100 | 5 | Traces only. |
| 100 | 10 | Do. |
| 100 | 20 | Do. |

Upon the 1:2 ratio of coffee to liquid (water and/or filtrate) depends largely the concentration of solids in the liquid coffee extract. The concentration obtained may be about 16 per cent and the yield of liquid extract of such concentration is from 100 to 120 per cent by weight of the roasted coffee taken. This concentration is much higher than that of any known liquid extract.

By the process herein described the desired, characteristic principles are efficiently extracted from coffee with the use of a relatively short heating period thereby minimizing loss of aromatic substances, or aroma.

The efficacy of the extraction is much greater with the use of finely ground coffee than with a coarser ground coffee since when finely ground it allows the use of short extraction periods, for example from 3 to 5 minutes, and forms compact cakes of extraction residue on the filter surfaces which de-water well under suction. Pulverization, however, should be avoided.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A process for the preparation of a coffee extract, which comprises mixing water with an extraction residue of finely ground roasted coffee, the amount by weight of the coffee from which the extraction residue was prepared being about 0.5 that of the water, heating said mixture at a temperature of about 90° C. to about 95° C. for from 3 to 5 minutes, filtering with the aid of suction whereby the liquid is obtained as a filtrate, mixing fresh finely ground roasted coffee with the filtrate so obtained, the amounts by weight being in the ratio of about 1:2, heating said mixture at a temperature of about 90° C. to about 95° C., for from 3 to 5 minutes, and then filtering with the aid of suction and cooling.

2. A process of preparing liquid coffee extract comprising the formation of three filtrates with the use of one charge of fresh finely ground roasted coffee, the third filtrate being formed by mixing the extraction residue obtained in the preparation of the second filtrate with water, the amount by weight of the original coffee charge from which the extraction residue was prepared being about 0.5 of the water; the second filtrate being formed by mixing the extraction residue obtained in the preparation of the first filtrate with said third filtrate, the first filtrate being formed by mixing a fresh coffee charge with the second filtrate; the mixtures in all stages being heated to boiling, cooked for from 3 to 5 minutes at a temperature of about 90° C. to about 95° C., and filtered through a suction filter, with the amounts of the second and third filtrates being augmented by water in amounts sufficient to cause the amount by weight of the original coffee charge to be about 0.5 that of each; said first filtrate being drawn off to constitute the coffee extract.

3. A process of preparing liquid coffee extract which comprises preparing a filtrate by mixing with water a twice extracted, finely ground roasted coffee extraction residue, the amount by weight of the coffee from which the extraction residue was prepared being about 0.5 of the water, heating said mixture at a temperature of about 90° C. to about 95° C. for not more than 5 minutes, filtering through a suction filter whereby the liquid is obtained as a filtrate; preparing a second filtrate by mixing said first mentioned filtrate with a once extracted, finely ground roasted coffee extraction residue in similar proportions, heating said mixture at a temperature of about 90° C. to about 95° C. for not more than 5 minutes and filtering through a suction filter; mixing a fresh amount of finely ground roasted coffee with said second filtrate, the amounts by weight of the coffee being about 0.5 of the filtrate; heating said mixture at a temperature of about 90° C. to about 95° C. for not more than 5 minutes and filtering through a suction filter to obtain a filtered extract.

4. A process for the preparation of coffee extract, which comprises mixing water with an extraction residue of finely ground roasted coffee, the amount by weight of the coffee from which the extraction residue was prepared being about 0.5 that of the water, heating said mixture at a temperature of about 90° C. to about 95° C. for not more than 5 minutes, filtering with the aid of suction whereby the liquid is obtained as a filtrate, mixing fresh finely-ground roasted coffee with the filtrate so obtained, the amounts by weight being in the ratio of about 1:2, heating said mixture at a temperature of about 90° C. to about 95° C. for not more than 5 minutes, and then filtering with the aid of suction and cooling.

HERBERT C. GORE.
CHARLES N. FREY.